United States Patent [19]
Lien

[11] Patent Number: 5,622,215
[45] Date of Patent: Apr. 22, 1997

[54] HEAT INSULATING SHEET FOR CAR DOOR WINDOWS

[76] Inventor: Jack Lien, No. 30, Yen-Chi St., San-Min Dist., Kaohsiung, Taiwan

[21] Appl. No.: 640,034

[22] Filed: Apr. 30, 1996

[51] Int. Cl.⁶ .................................................. B60J 1/20
[52] U.S. Cl. .................................... 160/370.21; 296/97.9
[58] Field of Search ................. 160/370.21, DIG. 2, 160/DIG. 3, 37, 105, 135, 370.22, 370.23, 90, 102; 296/97.1, 97.5, 97.7, 97.9

[56] References Cited

U.S. PATENT DOCUMENTS

| | | | |
|---|---|---|---|
| 2,267,542 | 12/1941 | Walz | 160/370.21 X |
| 3,511,365 | 5/1970 | Dow | 296/97.7 X |
| 4,746,162 | 5/1988 | Maness | 160/DIG. 3 X |
| 4,749,222 | 6/1988 | Idland | 160/370.21 X |
| 4,862,944 | 9/1989 | Hendershot | 160/370.21 |
| 5,002,327 | 3/1991 | Bickford | 296/97.7 |
| 5,022,701 | 6/1991 | Thompson | 296/97.9 X |
| 5,033,786 | 7/1991 | Bickford | 296/97.7 X |
| 5,044,685 | 9/1991 | Yang | 296/97.7 X |

Primary Examiner—David M. Purol
Attorney, Agent, or Firm—Varndell Legal Group

[57] ABSTRACT

A heat insulating sheet for car door windows, including a beveled guide strip adapted for attaching to the window glass near its lower end, the beveled guide strip having a glued back side adapted for adhering to the window glass, and a sheet body adapted for attaching to the window glass by way of static coupling and having a bottom end adapted for abutting against the beveled guide strip.

3 Claims, 3 Drawing Sheets

HEAT INSULATING SHEET FOR CAR DOOR WINDOWS

BACKGROUND OF THE INVENTION

The present invention relates to heat insulating sheets for car door windows, and relates more particularly to such a heat insulating sheet which can be conveniently installed in the window glass and, which does not drop from the window glass when the window glass passes in and out of the car door frame.

In order to prevent direction radiation of the light of the sun, heat insulating sheets may be used and installed in car door windows. However, it is not easy to fasten a heat insulating sheet to the window glass. When a heat insulating sheet is adhered to the window glass, it cannot be conveniently removed from the window glass for a replacement. Furthermore, when the window glass is lowered, the heat insulating sheet tends to be forced away from the window glass by the rubber packing strip of the car door window. U.S. Pat. No. 5,016,936 discloses a replaceable heat insulating paper for car door windows which can be conveniently attached to the window glass and then removed from it. However, in order to make the heat insulating paper convenient to be removed from the window glass, its adhesion power is made less strong, thereby causing the heat insulating paper to be easily forced away from the window glass by the rubber packing strip of the car door window when it is lowered with the window glass.

SUMMARY OF THE INVENTION

It is one object of the present invention to provide a heat insulating sheet for car door windows which can be conveniently installed in the window glass by the consumers. It is another object of the present invention to provide a heat insulating sheet for car door windows which does not drop from the window glass when the window glass passes in and out of the car door frame. It is still another object of the present invention to provide a heat insulating sheet for car door windows which can be conveniently detached from the window glass for a replacement.

DETAILED DESCRIPTION OF THE PREFERRED EMBODIMENT

Figure 2:
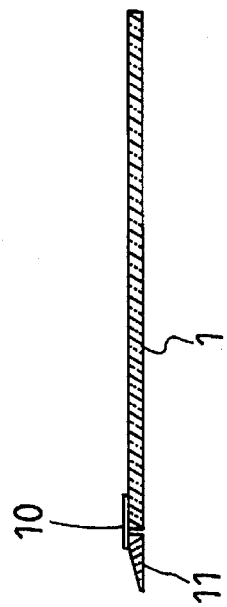
FIG. 2 is a sectional view of the heat insulating sheet shown in FIG. 1.
Figure 1:
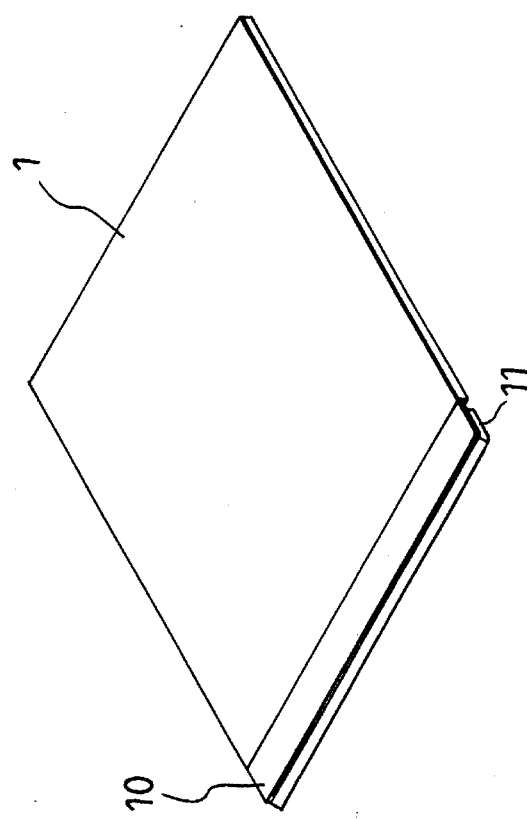
FIG. 1 is an elevational view of a heat insulating sheet according to one embodiment of the present invention.

Referring to FIGS. 1 and 2, a heat insulating sheet in accordance with the present invention is generally comprised of a sheet body 1, a beveled guide strip 11 transversely connected in parallel to the front side of the sheet body 1, and a connecting strip 10 adhered to the sheet body 1 and the beveled guide strip 11 at the top side to connect them together. The thickness of the beveled guide strip 11 can be equal or thicker than that of the sheet body 1.

Figure 4:
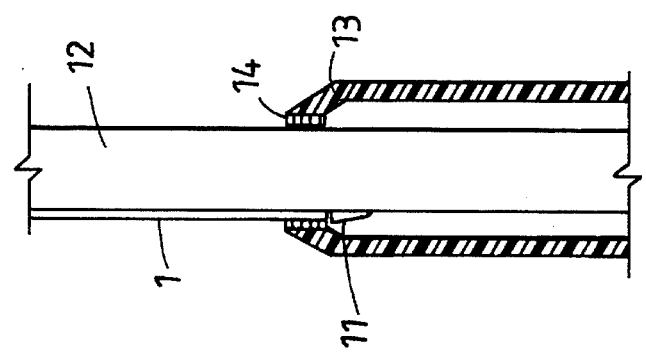
FIG. 4 shows the window glass lowered, the heat insulating sheet passed over the rubber packing strip into the inside of the car door frame according to the present invention.
Figure 3:
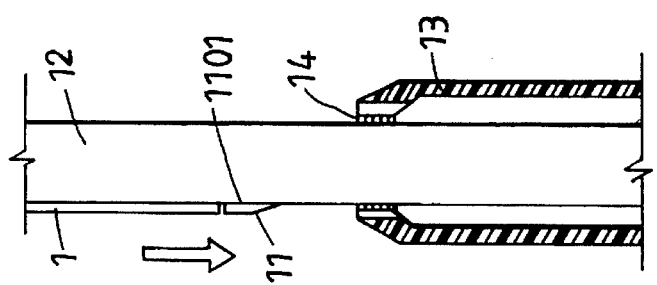
FIG. 3 is an installed view of the present invention, showing the heat insulating sheet installed in the window glass.

Referring to FIGS. 3 and 4, the beveled guide strip 11 has a glued back side 1101. When the stripping paper is removed from the glued back side 1101 of the beveled guide strip 11, the glued back side 1101 of the beveled guide strip 11 can then be adhered to the window glass 12 near its lower end. When the glued back side 1101 of the beveled guide strip 11 is adhered to the window glass 12, the sheet body 1 is closely attached to the surface of the window glass 12 by means of static coupling. When installed, the connecting strip 10 is detached from the sheet body 1 and the beveled guide strip 11. When the window glass 12 is lowered, the beveled guide strip 11 is moved to pass through the rubber packing strip 14 of the car door frame 13 to the inside thereof, and therefore the sheet body 1 can be smoothly guided into the inside of the car door frame 13.

Figure 7:
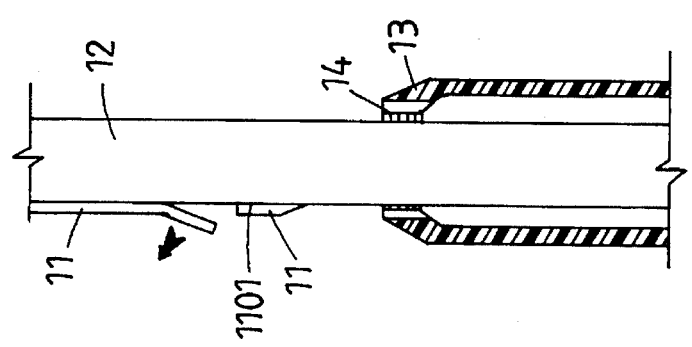
FIG. 7 shows the removal of the sheet body from the window glass according to the present invention.

Referring to FIG. 7, because the sheet body 11 is not adhered to the window glass 12 by an adhesive, it can be conveniently detached from the window glass 12 for a replacement.

Figures 5, 5A:
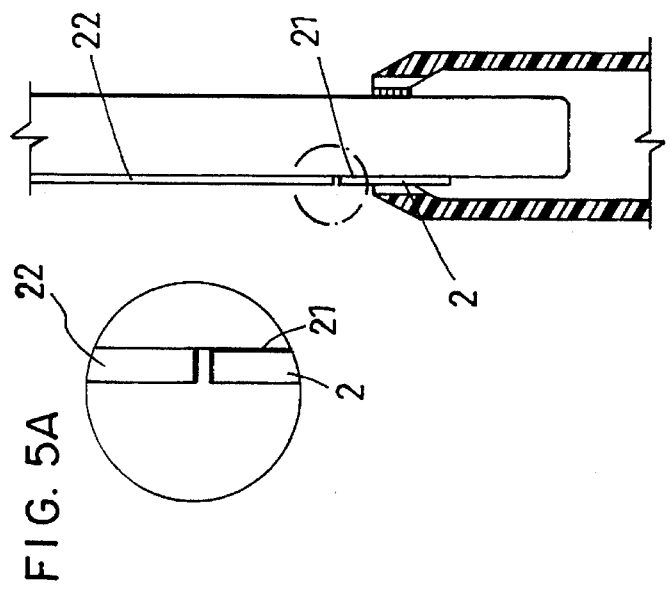
FIG. 5 is an installed view of an alternate form of the heat insulating sheet according to the present invention.
Figure 6:
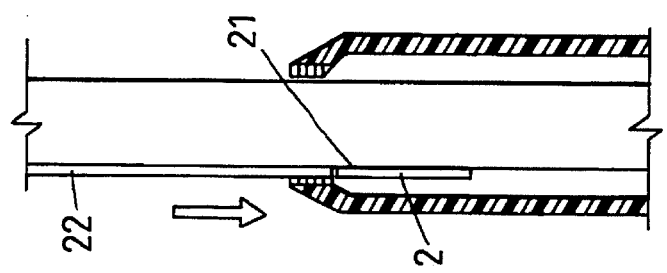
FIG. 6 shows the window glass of Figure 5 lowered and the heat insulating sheet thereof passed over the rubber packing strip into the inside of the car door frame.

FIGS. 5 and 6 show an alternate form of the present invention which comprises a guide strip 2 having a glued back side 21 adhered to the window glass, and a sheet body 22 separately attached to the window glass in line with the guide strip 2 by means of static coupling.

Figure 8:
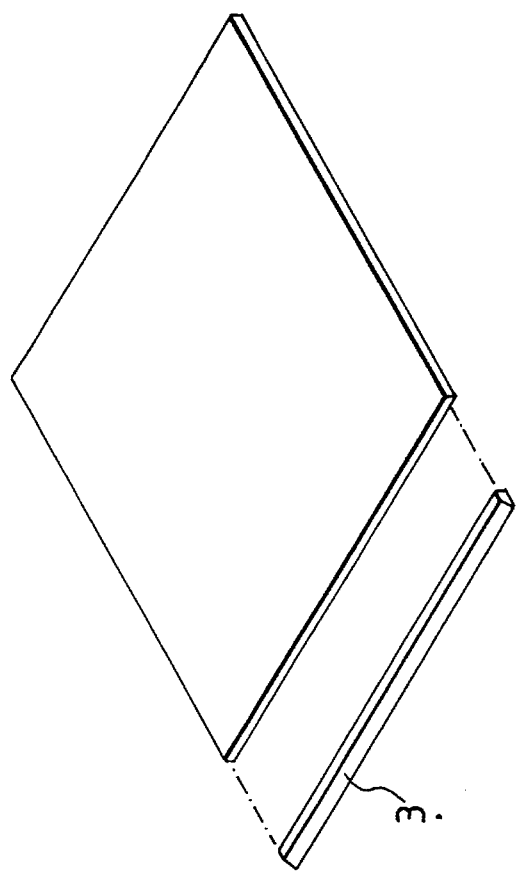
FIG. 8 shows another alternate form of the present invention.

FIG. 8 shows still another alternate glued guide strip 3 is directly adhered to one side
edge of the sheet body.

I claim:

1. A heat insulating sheet for car door windows, comprising:
   a beveled guide strip adapted for attaching to the window glass near its lower end, said beveled guide strip having a glued back side adapted for adhering to the window glass; and
   a sheet body adapted for attaching to the window glass by means of static coupling and having a bottom end adapted for abutting against said beveled guide strip.

2. The heat insulating sheet of claim 1 wherein the thickness of said beveled guide strip is not thinner than that of said sheet body.

3. The heat insulating sheet of claim 1 further comprising a detachable connecting strip adhered to said sheet body and said beveled guide strip to connect them together.

* * * * *